US012436801B2

(12) United States Patent
Phanishayee et al.

(10) Patent No.: US 12,436,801 B2
(45) Date of Patent: Oct. 7, 2025

(54) DEEP LEARNING SCHEDULER TOOLKIT

(71) Applicant: Microsoft Technology Licensing, LLC, Redmond, WA (US)

(72) Inventors: Amar Phanishayee, Seattle, WA (US); Saurabh Agarwal, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 431 days.

(21) Appl. No.: 17/985,120

(22) Filed: Nov. 10, 2022

(65) Prior Publication Data

US 2024/0160471 A1 May 16, 2024

(51) Int. Cl.
*G06F 9/48* (2006.01)
*G06F 9/50* (2006.01)

(52) U.S. Cl.
CPC .......... *G06F 9/4881* (2013.01); *G06F 9/5077* (2013.01); *G06F 2209/501* (2013.01); *G06F 2209/505* (2013.01)

(58) Field of Classification Search
None
See application file for complete search history.

(56) References Cited

U.S. PATENT DOCUMENTS

| 8,650,570 | B2 * | 2/2014 | Ringseth | G06F 9/4881 |
| | | | | 718/104 |
| 10,044,640 | B1 * | 8/2018 | Levine | H04L 47/827 |
| 2005/0086657 | A1 * | 4/2005 | Jason, Jr. | G06F 9/5027 |
| | | | | 718/102 |
| 2009/0300637 | A1 * | 12/2009 | Ringseth | G06F 9/4881 |
| | | | | 718/104 |
| 2019/0332422 | A1 | 10/2019 | Liu et al. | |
| 2020/0160171 | A1 * | 5/2020 | Rangarajan | G06N 3/08 |
| 2021/0011762 | A1 * | 1/2021 | Lin | G06N 3/105 |
| 2022/0198296 | A1 * | 6/2022 | Liu | H04L 67/52 |
| 2022/0326915 | A1 * | 10/2022 | Lee | G06N 20/00 |
| 2022/0374775 | A1 * | 11/2022 | Liu | G06F 9/5066 |
| 2023/0129998 | A1 * | 4/2023 | Jung | G06F 9/4881 |
| | | | | 718/102 |

OTHER PUBLICATIONS

Li et al.; "Aryl: An Elastic Cluster Scheduler for Deep Learning"; ByteDance; arXiv:2202.07896v1 [cs.DC] Feb. 16, 2022; (Li_2022. pdf; pp. 1-20) (Year: 2022).*

Peng et al.; "Optimus: An Efficient Dynamic Resource Scheduler for Deep Learning Clusters"; 2018 Association for Computing Machinery; https://doi.org/10.1145/3190508.3190517; (Peng_2018. pdf) (Year: 2018).*

(Continued)

*Primary Examiner* — Hiren P Patel
(74) *Attorney, Agent, or Firm* — Rainier Patents, P.S.

(57) ABSTRACT

The description relates to deep learning cluster scheduler modular toolkits. One example can include generating a deep learning cluster scheduler modular toolkit that includes multiple DL scheduler abstraction modules and interactions between the multiple DL scheduler abstraction modules and allows user composition of the multiple DL scheduler abstraction modules to realize a deep learning scheduler.

18 Claims, 7 Drawing Sheets

METHOD 700

(56) References Cited

OTHER PUBLICATIONS

Qiao et al.; "Pollux: Co-adaptive Cluster Scheduling for Goodput-Optimized Deep Learning"; 15th USENIX Symposium on Operating Systems Design and Implementation; Jul. 14-16, 2021; https://www.usenix.org/conference/osdi21/presentation/qiao; (Qiao_2021.pdf) (Year: 2021).*

Zhang et al.; "ReLeS: A Neural Adaptive Multipath Scheduler based on Deep Reinforcement Learning"; 2019 IEEE; (Zhang_2019.pdf; pp. 1648-1656) (Year: 2019).*

Yao et al.; "Meta-learning with an Adaptive Task Scheduler"; 35th Conference on Neural Information Processing Systems (NeurIPS 2021); (Yao_2021.pdf; pp. 1-13) (Year: 2021).*

Kohler, et al., "The Click Modular Router", Laboratory for Computer Science, MIT, ACM SIGOPS Operating Systems Review, vol. 33, Issue 5, Dec. 1999, pp. 217-231.

Wu, et al., "Google's neural machine translation system: Bridging the gap between human and machine translation", In Publication of arXiv preprint arXiv:1609.08144, Sep. 26, 2016, pp. 1-23.

Hindman, et al., "Mesos: A Platform for Fine-grained Resource Sharing in the Data Center", In Proceedings of the 8th USENIX conference on Networked systems design and implementation, Mar. 30, 2011, pp. 1-14.

"Artifact for Pollux OSDI 2021", Retrieved From: https://github.com/petuum/adaptdl/tree/osdi21-artifact, Aug. 23, 2021, 3 Pages.

"AWS RDS instance created from snapshot very slow", Retrieved From: https://stackoverflow.com/questions/47545414/aws-rds-instance-created-from-snapshot-very-slow%20, Dec. 10, 2021, 2 Pages.

"Checkpoint-restore in userspace (criu)", Retrieved From: https://criu.org/Main_Page, May 18, 2022, 3 Pages.

"GRPC, A high-performance, open-source universal RPC framework.", Retrieved from: https://web.archive.org/web/20210416144134/https://grpc.io/, Apr. 16, 2021, 2 Pages.

"Kubernetes", Retrieved From: https://kubernetes.io/, Retrieved on: Oct. 31, 2022, 6 Pages.

Acun, et al., "Understanding training efficiency of deep learning recommendation models at scale", In IEEE International Symposium on High-Performance Computer Architecture (HPCA), Feb. 27, 2021, 13 Pages.

Brown, et al., "Language Models are Few-Shot Learners", In Repository of arXiv:2005.14165, May 28, 2020, 72 Pages.

Chaudhary, et al., "Balancing Efficiency and Fairness in Heterogeneous GPU Clusters for Deep Learning", In Proceedings of the Fifteenth European Conference on Computer Systems, Apr. 15, 2020, 16 Pages.

Cranshaw, et al., "Clipper: A Low-Latency Online Prediction Serving System", In Proceedings of 14th USENIX Symposium on Networked Systems Design and Implementation, Mar. 27, 2017, 17 Pages.

Dean, et al., "MapReduce: Simplified Data Processing on Large Clusters", In Journal of Communications of the ACM Magazine, vol. 51, Issue 1, Jan. 2008, pp. 107-113.

Devlin, et al., "BERT: Pre-training of Deep Bidirectional Transformers for Language Understanding", In Repository of arXiv:1810.04805v1, Oct. 11, 2018, 14 Pages.

Ford, et al., "The Flux OS Toolkit: reusable components for OS implementation", In Proceedings of the Sixth Workshop on Hot Topics in Operating Systems, May 5, 1997, pp. 1-6.

Ford, et al., "The flux OSKit: A substrate for kernel and language research", In Proceedings of the 16th ACM Symposium on Operating Systems Principles, Oct. 5, 1997, pp. 38-51.

Goodfellow, et al., "Generative Adversarial Networks", In Repository of arXiv: 1406.2661, Jun. 10, 2014, 09 Pages.

Gu, et al., "Tiresias: A GPU Cluster Manager for Distributed Deep Learning", In Proceedings of the 16th USENIX Symposium on Networked Systems Design and Implementation, Feb. 26, 2019, pp. 485-500.

Gujarati, et al., "Serving DNNs Like Clockwork: Performance Predictability from the Bottom Up", In Proceedings of the 14th USENIX Symposium on Operating Systems Design and Implementation (OSDI 20), Nov. 4, 2020, pp. 443-462.

He, et al., "Deep Residual Learning for Image Recognition", In Proceedings of the IEEE Conference on Computer Vision and Pattern Recognition, Jun. 27, 2016, pp. 770-778.

Hochreiter, et al., "Long Short-Term Memory", In Journal of Neural Computation, vol. 9, Issue 8, Nov. 15, 1997., pp. 1735-1780.

Hwang, et al., "Elastic resource sharing for distributed deep learning", In 18th USENIX Symposium on Networked Systems Design and Implementation, May 6, 2021, 19 Pages.

Jeon,, et al., "Analysis of Large-Scale Multi-Tenant GPU Clusters for DNN Training Workloads", In Proceedings of the USENIX Conference on Usenix Annual Technical Conference, Jul. 10, 2019, pp. 947-960.

Jouppi, et al., "A domain-specific supercomputer for training deep neural networks", In Article of Communications of the ACM, vol. 63, Issue 7, Jul. 2020, pp. 67-78.

Kingma, et al., "Adam: A method for stochastic optimization", In Proceedings of the 3rd International Conference on Learning Representations, Dec. 22, 2014, 15 Pages.

Kohler, et al., "The click modular router", In ACM Transactions on Computer Systems, vol. 18, Issue 3, Aug. 1, 2000, pp. 263-297.

Krizhevsky, et al., "ImageNet Classification with Deep Convolutional Neural Networks", In Proceedings of 26th Annual Conference on Neural Information Processing Systems, Dec. 3, 2012, pp. 1-9.

Le, et al., "AlloX: compute allocation in hybrid clusters", In Proceedings of the Fifteenth European Conference on Computer Systems, Apr. 17, 2020, pp. 1-16.

Li, et al., "Hyperband: A Novel Bandit-Based Approach to Hyperparameter Optimization", In Journal of Machine Learning Research, vol. 18, Issue 1, Apr. 1, 2018, pp. 1-52.

Mahajan, et al., "THEMIS: Fair and Efficient GPU Cluster Scheduling", In Proceedings of the 17th USENIX Symposium on Networked Systems Design and Implementation, Feb. 25, 2020, pp. 289-304.

Microsoft, "Open platform for ai", Retrieved From: https://github.com/microsoft/pai, May 18, 2021, 8 Pages.

Mnih, et al., "Asynchronous Methods for Deep Reinforcement Learning", In Proceedings of the 33nd International Conference on Machine Learning, Jun. 16, 2016, 19 Pages.

Mohan, et al., "Synergy: Resource sensitive dnn scheduling in multitenant clusters", In 16th USENIX Symposium on Operating Systems Design and Implementation, Aug. 24, 2022, 21 Pages.

Moussawi, "Towards large scale training of autoencoders for collaborative filtering", In Repository of arXiv:1809.00999, Aug. 30, 2018, 2 Pages.

Narayanan, "Heterogeneity-Aware cluster scheduling policies for deep learning workloads", In 14th USENIX Symposium on Operating Systems Design and Implementation, Nov. 4, 2020, 18 Pages.

Peng, et al., "Optimus: An Efficient Dynamic Resource Scheduler for Deep Learning Clusters", In Proceedings of the Thirteenth EuroSys Conference Pattern Recognition, Apr. 23, 2018, 14 Pages.

Petuum, "Adaptdl", Retrieved From: https://github.com/petuum/adaptdl, May 18, 2022, 4 Pages.

Qiao, et al., "Pollux: Co-adaptive cluster scheduling for goodput-optimized deep learning", In 15th {USENIX} Symposium on Operating Systems Design and Implementation, May 26, 2021, 18 Pages.

Radford, et al., "Language Models are Unsupervised Multitask Learners", In Journal of OpenAI Blog, vol. 1, Issue 8, Feb. 24, 2019, 24 Pages.

Raffel, et al., "Exploring the Limits of Transfer Learning with a Unified Text-to-Text Transformer", In Repository of arXiv:1910.10683v2, Oct. 24, 2019, pp. 1-53.

Shen, et al., "Nexus: A GPU Cluster Engine for Accelerating DNN-Based Video Analysis", In Proceedings of the 27th ACM Symposium on Operating Systems Principles, Oct. 27, 2019, pp. 332-337.

Shoeybi, et al., "Megatron-LM: Training Multi-Billion Parameter Language Models Using GPU Model Parallelism", In Repository of arXiv:1909.08053v3, Sep. 17, 2019, 15 Pages.

(56) References Cited

OTHER PUBLICATIONS

Sun, et al., "High-Resolution Representations for Labeling Pixels and Regions", In Repository of arXiv:1904.04514v1, Apr. 9, 2019, 13 Pages.
Vaswani, et al., "Attention is All You Need", In Proceedings of 31st Conference on Neural Information Processing Systems, Dec. 4, 2017, pp. 1-11.
Vavilapalli, et al., "Apache Hadoop YARN: Yet another Resource Negotiator", In Proceedings of the 4th annual Symposium on Cloud Computing, Oct. 1, 2013, 16 Pages.
Verma, et al., "Large-scale cluster management at Google with Borg", In Proceedings of the Tenth European Conference on Computer Systems, Apr. 21, 2015, 17 Pages.
Weng, et al., "MLaaS in the wild: Workload analysis and scheduling in Large-Scale heterogeneous GPU clusters", In 19th USENIX Symposium on Networked Systems Design and Implementation, Apr. 4, 2022, pp. 945-960.
Xiao, et al., "AntMan: dynamic scaling on GPU clusters for deep learning", In Proceedings of the 14th USENIX Conference on Operating Systems Design and Implementation, Nov. 4, 2020, pp. 533-548.
Xiao, et al., "Gandiva: Introspective Cluster Scheduling for Deep Learning", In Proceedings of the 13th USENIX Symposium on Operating Systems Design and Implementation, Oct. 8, 2018, pp. 595-610.
Yoo, et al., "SLURM: Simple Linux Utility for Resource Management", In Workshop on job scheduling strategies for parallel processing, Jun. 23, 2003, 27 Pages.
Zaharia, et al., "Spark: Cluster Computing with Working Sets", In Proceedings of 2nd USENIX Workshop on Hot Topics in Cloud Computing, Jun. 22, 2010, pp. 1-7.
Zhao, et al., "HiveD: sharing a GPU cluster for deep learning with guarantees", In Proceedings of the 14th USENIX Conference on Operating Systems Design and Implementation, Nov. 4, 2020, pp. 515-532.
Zhu, et al., "Unpaired image-to-image translation using cycle-consistent adversarial networks", In Proceedings of the IEEE international conference on computer vision, Oct. 22, 2017, pp. 2223-2232.
International Search Report and Written Opinion received for PCT Application No. PCT/US2023/035359, mailed on Dec. 20, 2023, 11 pages.
International preliminary report on patentability Received in European Patent Application No. PCT/US23/035359, mailed on May 22, 2025, 07 pages.

* cited by examiner

DLCSMT cluster info schema 300

| GPU_ID 302 | GPU_type 304 | Local GPU_ID 306 | Node_ID 308 | Node IP 310 | Job_IDs Running 312 | Total memory 314 | Free memory 316 | Total GPU memory 318 | Free GPU memory 320 | Additional Info 322 |
|---|---|---|---|---|---|---|---|---|---|---|

FIG. 3

DEEP LEARNING SCHEDULER TOOLKIT

BACKGROUND

Deep learning is being used to accomplish an ever-increasing array of tasks, such as, facial recognition, speech recognition, language translation, etc. Deep learning models are continually being developed to accomplish individual tasks. Training deep learning models requires extensive hardware resources.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 3 shows an example deep learning cluster scheduler modular toolkit cluster info schema that is consistent with some implementations of the present concepts.

DETAILED DESCRIPTION

Figure 1A:
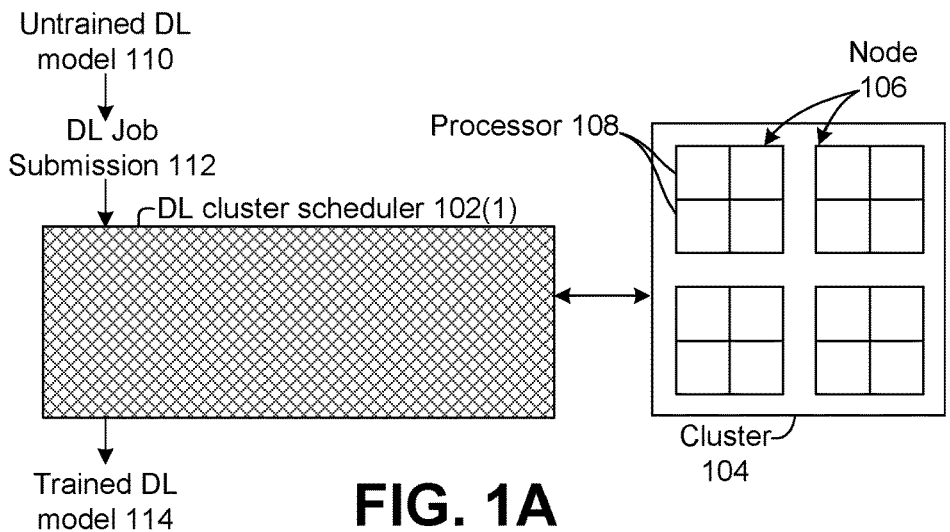
FIGS. 1A-1C show example deep learning cluster schedulers in which the present concepts can be applied in some implementations.

This patent relates to deep learning (DL) and associated hardware, scheduling, and/or training. Training DL models can occupy large numbers of computing resources (e.g., clusters) for long time durations. Generally, the clusters are shared between many deep learning model training jobs. Deep learning cluster schedulers manage cluster usage so that multiple DL models can efficiently utilize the cluster resources during their training phases. Deep learning cluster schedulers balance various aspects toward achieving desired efficiencies. Traditionally, deep learning cluster schedulers are self-contained programs that are difficult to change. As such, when developers want to change the balance of the aspects, they tend to write a whole new deep learning cluster scheduler. The present concepts provide a new paradigm in the form of a deep learning cluster scheduler modular toolkit that facilitates defining and/or changing individual aspects without changing other portions of a deep learning cluster scheduler.

More specifically, the present concepts relate to deep learning cluster scheduler modular toolkits that facilitate development and refinement of deep learning cluster schedulers (hereinafter, 'DL schedulers'). Deep learning based workloads have seen a rapid increase in popularity in enterprise clusters. To support DL jobs efficiently, several new DL schedulers have been proposed in recent years. With rapidly evolving DL workloads, it is challenging to quickly prototype and compare policies across workloads. Further, as prior systems target different aspects of scheduling (resource allocation, placement, elasticity etc.), it is also challenging to combine these techniques and understand the overall benefits. The present concepts provide a technical solution in the form of deep learning cluster scheduler modular toolkits which allow developers to compose individual components and realize scheduling frameworks. For readability, these deep learning cluster scheduler modular toolkits may be referred to herein as 'DLCSMT' for sake of brevity.

Modern deep learning configurations, such as deep neural networks (DNNs) are increasingly used in enterprises to solve a range of problems such as image classification, semantic segmentation, image generation, translation, and/or language modeling. These workloads pose new demands when compared to big-data workloads, along a number of dimensions. For instance, DNN jobs are not made up of short diverse tasks but instead are long running jobs with repeated iterations over different input data items. Thus, DNN jobs have different granularities for job preemption, have sophisticated application-based metrics for termination (e.g., training loss) and elasticity (e.g., training progress), and have multi-dimensional resource requests both along the newer dimensions of compute acceleration (e.g., TPUs or GPUs) as well as traditional resource types (e.g., compute, memory, and/or interconnects). Given the prevalence and importance of these workloads there has been a large body of recent research that has proposed DL schedulers to support and exploit the unique characteristics of these jobs.

Analyzing trends across DL schedulers, indicates that each prior DL scheduler is implemented in isolation. While these prior DL schedulers propose new innovations for deep learning scheduling, the contributions are typically restricted to a narrow part of the stack e.g., new resource allocation policies, handling elasticity, and/or placement policies. However, these traditional techniques either develop an entirely new stack or target their policies to a specific enterprise stack.

Having each DL scheduler use a different stack makes it challenging to compare or compose their innovations. The rapid evolution of deep neural network (DNN) workloads has seen popular DNN architectures evolve from convoluted neural networks (CNNs) to recurrent neural networks (RNNs) to transformer-based models. Given the workload evolution it becomes necessary to reevaluate DL scheduler efficacy to answer questions such as: how effective is consolidated placement for newer models? Further, it is also challenging to compose contributions of different DL schedulers to evaluate their overall impact. For example, how effective is a consolidated placement policy while using allocations from an individual DL scheduler?

While simulations have been used in the past to perform end-to-end comparisons across DL schedulers, the insights derived from existing simulators are limited. As DL training jobs are long running, it tends to be necessary to use simulators to evaluate new scheduling policies. Simulation allows interested entities, such as researchers to scale to large clusters and avoid running expensive DL training jobs repeatedly. As used herein, 'cluster' means a group of computers that work together. While prior techniques typically validate that end-to-end results for one setting match those from a real cluster, there is often little correspondence between the simulator code and the actual cluster scheduler runtime code. This makes it challenging to use existing simulators to understand how different scheduling techniques compare or compose.

The present concepts provide technical solutions to the above problems. The technical solutions employ the new deep learning cluster scheduler modular toolkits with a set of clean, modular abstractions and implementations that can serve as building blocks for developers of new research DL schedulers.

The present concepts identify and leverage seven key abstractions that can be composed to realize DL schedulers. These DLCSMT abstractions include a job admission policy that determines how newly arriving jobs are handled, a job scheduling policy that calculates the fraction of resources allocated to a job in a scheduling round and a job placement policy that determines which machines are selected to run a particular job. Other abstractions are described below relative to FIG. 2. In addition to identifying the abstractions themselves, the present concepts identify concrete interactions and interfaces across these abstractions that taken together facilitate the construction of complex scheduler systems.

The technical solutions implement concrete instances of these abstractions. The technical solutions can achieve one goal of scheduling of DL training jobs and a second goal of supporting schedulers for inference and hyper parameter tuning jobs because of the general nature of the DLCSMT abstractions.

Deep learning cluster scheduler modular toolkits provide a technical solution relating to ease of extensibility of new scheduling policies for DL training. An example first new scheduling policy includes a loss-based job termination feature that can proactively free up resources when model training has converged. An example second new scheduling policy includes a new learning-based placement policy that minimizes interference across jobs co-located on the same machine. The latter scheduling policy does this by using a model to predict cross-job interference while iteratively assigning jobs to machines, thus eschewing expensive pre-profiling across all job combinations. One example loss-based termination policy reduces job completion time (JCT) by around 44% and an example learning based policy speeds up 80% of the jobs which would have experienced slowdown due to interference-agnostic placement.

The present description also validates the usability and reproducibility of simulations in DLCSMT along three dimensions. The modular design of DLCSMT ensures that only two modules are modified between simulations and cluster runs. Verified DLCSMT simulations can match real executions using a 32 GPU cluster, for example. Additionally, implementations of prior schedulers are verified for accuracy by comparing a Pollux implementation in DLCSMT with prior open source implementations.

Prior to the advent of DL training workloads, existing cluster scheduling frameworks were used for scheduling task-based big-data jobs or long running internet services like HTTP servers. However, these existing schedulers are not sufficient for DL training jobs because of two main reasons. First, existing schedulers handle large big-data jobs that are composed of several short-running tasks or long running internet services that run at high priority and thus are usually never preempted. On the other hand, DL jobs are usually long running with their computation being repeated for a large number of iterations. Therefore, DL schedulers, unlike big data schedulers, need to frequently preempt a running job to prevent "head-of-line-blocking" for better resource management. Second, DL schedulers often need access to application-level metrics like loss, gradient norm, throughput, etc., to exploit DL-specific aspects like finish-time fairness or gradient-based elasticity, which is not easily available in existing scheduling frameworks. Developing and deploying DL schedulers is further complicated by the fact that DL workloads are also rapidly evolving. For example, while convolutional neural networks (CNN) models like VGG16 and ResNet50 were widely used a few years ago, industry reports show that transformer-based models such as BERT and deep learning based recommendation models (DLRM) now form a significant portion of the enterprise machine learning (ML) workload. Further, newer processor hardware such as TPUs (or newer generation of GPUs) also necessitate new mechanisms for scheduling. This rapid evolution of workload and hardware is a technical problem that can be solved with scheduling frameworks that can support quick prototyping of new policies and simulations at large scale to compare new policies and old policies on evolving workloads.

The description now explains the functionalities and deficiencies of existing schedulers. Unlike the task-based scheduling approach used by existing schedulers, DL schedulers are round-based. That is, after a fixed interval (round length) they make scheduling decisions regarding which jobs to run and this often requires preempting in-progress jobs. Round-based scheduling has been shown to be necessary for achieving good cluster efficiency, low queuing times and avoiding head-of-line blocking. Furthermore, round-based scheduling implies the need for mechanisms that can support checkpointing and preemption of jobs as well as resuming jobs from checkpoints.

Most prior techniques in DL scheduling are focused on developing policies that can improve a number of metrics including job completion time (JCT), makespan (e.g., job length), cluster utilization, throughput and fairness. These scheduling policies are typically invoked at the end of every round to decide which jobs should be selected to run in the next round and how many resources should be allocated to each selected job. Since DL training jobs are also known to be placement sensitive, some schedulers also use additional placement policies to decide which machine in the cluster will run this job.

To perform scheduling, DL schedulers use a number of system-level and application-level metrics. Previous schedulers use system level metrics like GPU memory usage, DRAM usage, etc., to make scheduling decisions. A number of other schedulers also use application-level metrics like per iteration time or training progress. The structure and the high-level components are broadly similar across DL schedulers. It is only the internals of the components that change, e.g., all existing schedulers need some metrics like GPU usage, throughput, gradient noise, etc., to make scheduling decisions and the only change across schedulers is in what metrics are required. To address this insight, the present concepts provide a technical solution that includes a set of abstractions required for DL scheduling. These key abstractions can be manifest as DLCSMT implementations that can operate with a wide range of DL schedulers. DLCSMT provides a technical solution that various entities, such as the systems research community, can use to accelerate the development of new scheduler research targeting DL jobs. Thus, it has traditionally been difficult to make an accurate comparison of different DL schedulers. The present DLCSMT implementations provide a set of abstractions that allow for quick and easy evaluation of a new DL scheduler. Alternatively or additionally, the DLCSMT abstractions allow accurate comparisons of DL schedulers applied to DL models and a set of resources (e.g., cluster). These aspects are explained in more detail below relative to FIG. 2.

Figure 1B:
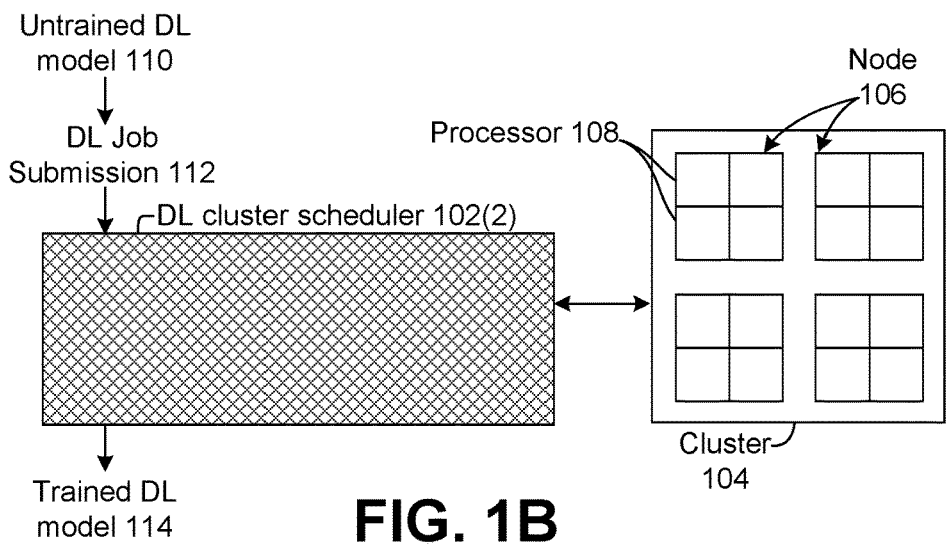
Figure 1C:
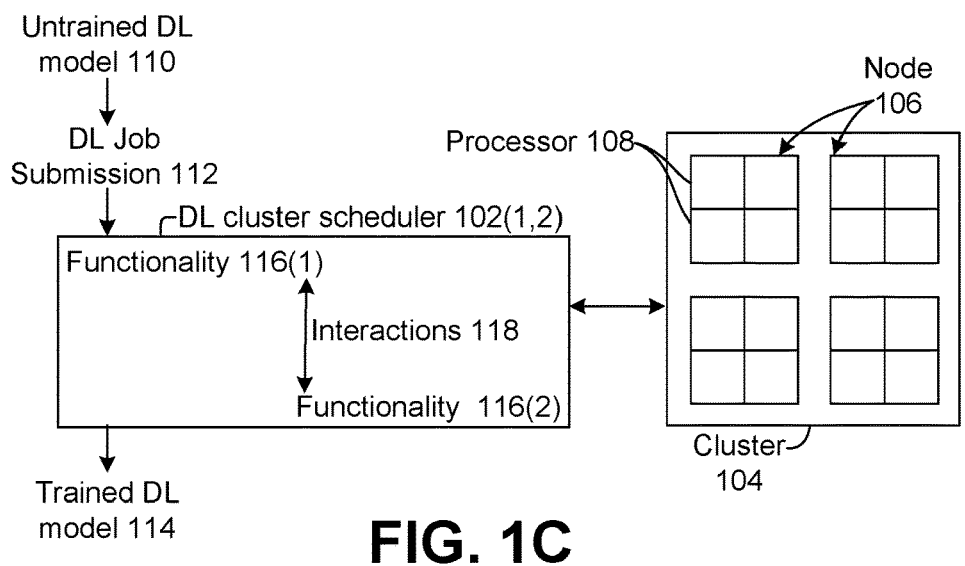

FIGS. 1A-1C collectively illustrate some of the aspects introduced above. FIG. 1A shows a traditional scheduler scenario involving a DL cluster scheduler 102(1) relating to a cluster 104 that includes nodes or machines 106. Each node 106 can include multiple components, such as multiple processors 108. (To avoid clutter on the drawing page only representative nodes 106 and processors 108 are labelled on the drawing page. Also, for purposes of explanation, cluster 104 includes four nodes, but in other implementations the cluster may include other numbers of nodes and often many more nodes, such as in hundreds or thousands of nodes).

Untrained DL models 110 can be submitted as DL job submissions 112. Often, multiple untrained DL models 110 are submitted at any one time. The DL scheduler 102 utilizes various aspects to allocate cluster resources to train the DL job submissions 112 on the cluster 104 to produce trained DL model 114.

The DL scheduler 102(1) is shown with cross-hatching to represent a 'black box' in that scheduling aspects are difficult to discern and distinguish within the scheduler. Thus, if an entity such as a researcher wants to change these aspects, they generally end up writing a new DL scheduler as represented by DL scheduler 102(2) in FIG. 1B. The researcher can then run the same and/or different untrained DL model 110 on DL scheduler 102(2) and analyze the performance. This is a time consuming and inefficient process.

FIG. 1C introduces some of the present concepts associated with recognizing functionalities 116 and interactions 118 between the functionalities in many DL schedulers (represented here as 102(1,2)). This recognition contributed to the concepts shown and described below relative to FIG. 2.

Figure 2:
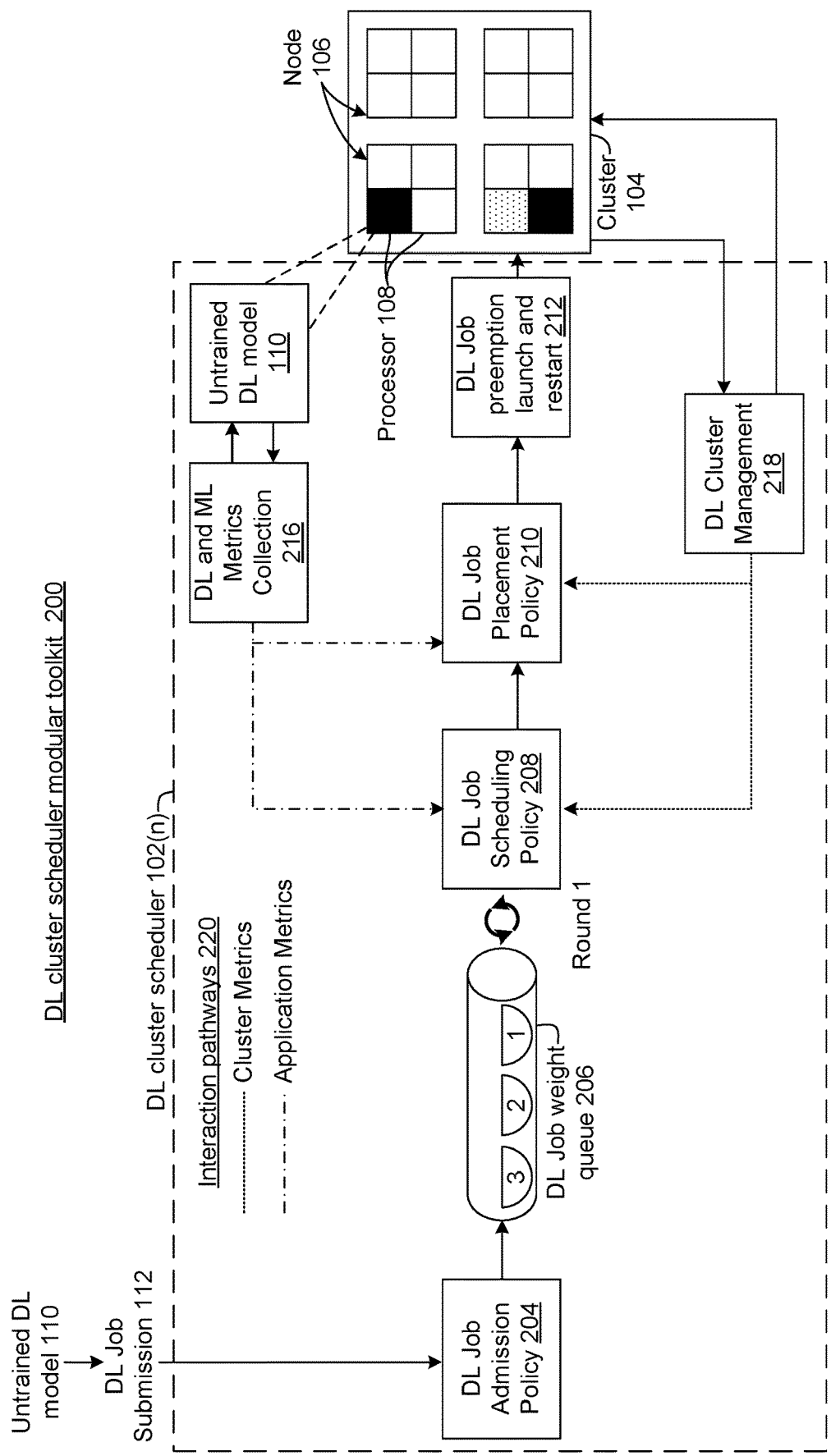
FIG. 2 shows an example deep learning cluster scheduler modular toolkit that is consistent with some implementations of the present concepts.

FIG. 2 shows an example DL cluster scheduler modular toolkit 200. The DL cluster scheduler modular toolkit includes several DLCSMT abstractions and associated interactions (e.g., workflow). Consistent with the explanation above, this example includes DL job submission 112 that receives untrained DL models 110. The DLCSMT abstractions are manifest as a job admission policy module 204, a job wait queue 206, a job scheduling policy module 208, a job placement policy module 210, a job preemption, launch, and restart module 212, a metrics collection module 216, and a cluster management module 218. The DLCSMT abstractions work with untrained DL model 110. The DL cluster scheduler modular toolkit 200 also defines interaction pathways 220 between modules (e.g., which pairs of modules communicate or interact with each other and the type of information they communicate, such as cluster metrics or application metrics).

Briefly, the defined modules of the DL cluster scheduler modular toolkit 200 allow DL schedulers 102(n) to be generated in a modular fashion. (Note that the dashed line of the DL schedulers 102(n) on the drawing page is intended to convey that the DL schedulers 102(n) are generated consistent with the policies of the modules of the DL cluster schedulers 102(n) and is not intended to convey that the DL cluster scheduler modular toolkit 200 and the DL schedulers 102(n) are one in the same.) The modular fashion allows individual portions associated with an individual policy of the DL scheduler to be adjusted without changing other portions relating to other policies. Thus, an entity can readily and quickly adjust the DL scheduler to enhance performance for the DL model(s) being trained. Thus, as DL models evolve, the DL cluster scheduler modular toolkit 200 allows the DL scheduler to be readily and quickly adapted rather than lagging behind as currently occurs.

Job admission policy module 204 allows DL schedulers to elect to impose restrictions on the DL jobs they will accept. For example, entities, such as administrators may set limits for the resources each user can request. The limits can relate to user job quotas, user resource quotas, job type quotas, and/or job resource quotas, among others. In DLCSMT, the job admission policy module 204 provides this abstraction and can be used to implement per-user quotas to limit resources available to a user or limit resources requested by a job, etc.

Job scheduling policy module 208 captures logic used to decide which of the available jobs are chosen to run. Entities, such as researchers can use the job scheduling policy module 208 to implement various desired scheduling policies. For instance, one example desired scheduling policy can be a largest marginal gain policy which provides additional machines to the jobs that will benefit the most from extra resources. Other example policies can relate to FIFO, FIFO plus priority, LAS, SRTF, maximize throughput, discreet LAS, largest marginal gain, FTF, and heterogeneity-aware, among others. DLCSMT's interface for job scheduling provides as input a view of the cluster 104 and information about jobs running in the cluster. The job scheduling policy module 208 outputs a list of jobs selected for scheduling in this round, sorted by priority. This aspect is described in more detail below.

Job placement policy module 210 allows job placement policies to be implemented because the performance of DL jobs is sensitive to placement. DLCSMT provides an abstraction to specify the job placement policy, e.g., a common job placement policy used by several DL schedulers is to pack all multi-GPU jobs on the least number of nodes 106 possible, whereas other DL schedulers do this in an application-aware way. Other aspects the user can specify include, first available, maximize consolidation, application determined placement, and/or minimum network interface, among others.

DL job preemption, launch, and restart module 212 provides an abstraction to launch and/or pause machine learning jobs on clusters 104. Note that while described as a combined module in this implementation, in other implementations, these abstractions can be split into separate modules. For instance, DL job launch and restart could be a module and DL preemption could be a separate module.

DL job preemption, launch, and restart module 212 provides an abstraction which supports command line arguments as well as docker containers, and/or zipfiles, among others. Job preemption, launch, and restart module 212 can also provide a job preemption and restore functionality. Round-based DL schedulers need to preempt and resume training jobs. This typically requires checkpointing the DL model and some extra additional state. There have been several methods developed for checkpointing with the most common method being iteration boundary based checkpointing. In iteration boundary based checkpointing, preemption is performed at the completion of an iteration and models can be saved using the functionalities provided by machine learning (ML) libraries. Some existing techniques have also used checkpoint-restore in userspace (CRIU) based checkpointing. The abstraction provided by DLCSMT allows DL scheduler developers to be free to choose the best checkpointing method and DLCSMT seamlessly integrates job suspension, restore, run to completion, iteration boundary, and/or CRIU with the rest of the DL scheduler.

DLCSMT's metric collection module 216 provides an interface (e.g., APIs) which allows users to easily collect metrics like loss value, loss, throughput, per-iteration time, finish time fairness estimate, and/or inference requests per unit time, among others, to make scheduling decisions. The metric collection module's interface allows users to register the specific metrics they wish to collect and point DLCSMT to those values. The interface in DLCSMT ensures that the latest values of the registered metrics are available for making scheduling and placement decisions before each round.

Cluster management module 218 allows a DL scheduler to be aware of the availability of nodes 106 and the amount of compute, memory, etc., available on those nodes for deciding which jobs to schedule on which node. This cluster management module 218 is responsible for maintaining a cluster machine map (e.g., job-resource mapping and resource free list), tracking the currently running job-to-resource mapping, adding/removing nodes to the cluster, and maintaining a free list of resources in the cluster. Cluster management module 218 is also responsible for discovering new nodes which have been added to the cluster. Users can extend this module to add additional functionalities like cluster elasticity in a cloud environment, i.e., cluster manager can automatically increase or decrease the size of a cluster based on the number of running jobs.

The description above explains the abstractions for individual modules in DLCSMT. The description below explains how DLCSMT enables users to compose these modules to realize DL schedulers. One of the primary challenges in designing DLCSMT application program interfaces (APIs) relates to how to share state across modules. The DLCSMT design offers global, extensible data structures that are visible to all modules and contain both job-level and cluster-level information. The description below explains how in some implementations, parts of the cluster-level data structures can only be modified by DLCSMT, while modules can use the job-level map to pass state across modules.

Some DLCSMT designs include two data structures: job info and cluster info. Job info is a mutable map of all the runnable job ID's and their corresponding information. Job info data structure 1.

```
{JOB_ID: {"launch_method": .....,
    "launch_command": .....,
    "GPU_Demand": .....,
    "runtime_metrics": {"per_iteration_time": ..,
        "train_loss: ..}.
    }
}
```

This job info data structure 1 can hold all of the information for a given job. Some of the fields like "launch_method", "launch_command", "GPU_Demand" are mandatory, in this implementation. Maintaining this information in a mutable map allows modules to add any field and use it to pass state to other modules. Cluster info is a columnar data structure containing the information about the cluster designed primarily for quickly querying data. In cluster info fields other than additional info are mandatory and are automatically managed by DLCSMT.

FIG. 3 shows an example DLCSMT cluster info schema 300 that is consistent with some implementations. Cluster info is a columnar DLCSMT cluster info schema in a columnar data-format that tracks the state of the cluster. In this case, the information entails a GPU identification field (GPU_ID) 302, a GPU_type field 304, Local GPU_ID field 306, Node_ID field 308, Node IP field 310, Jobs_IDs running field 312, total memory field 314, free memory field 316, total GPU memory field 318, free GPU memory field 320, and additional info field 322. DLCSMT cluster info schema 300 is designed primarily for quickly querying data. In some implementations, cluster info fields other than additional info 322 are mandatory and are automatically managed by DLCSMT 200 (e.g., DLCSMT automatically populates fields 302-320).

DLCSMT facilitates simulation of DL models. Simulation forms an integral part of scheduling research. Entities, such as researchers use simulation as a testbed to gain insight about their proposed changes to DL models. For simulation, traditionally entities capture metrics like iteration time, convergence curves, etc., on a real cluster and then perform simulation by generating a workload which is typically derived from a trace. Simulation also allows entities to easily vary the load, job resource demands, size of the cluster, etc., to study the performance of a new scheduling logic in different scenarios. In some implementations, DLCSMT provides built-in simulation capability with a module to perform simulation. This aspect of DLCSMT can provide a technical solution of overlapping a relatively high percentage of code (e.g., as much code as possible) between the simulator and the actual DL model implementation.

In some implementations, two modules in DLCSMT can be modified to enable simulation. First, the DL and ML metrics collection module 216 can adjust how the metrics are collected and updated. In the case of simulation, instead of fetching the metrics from the DL training applications (e.g., untrained DL models 110) running on the cluster, the updated metrics can be obtained from a user provided custom metric update logic. The second difference relates to the job preemption, launch, and restart module 212. During simulation, instead of making actual calls to launch or suspend jobs, the job preemption, launch, and restart module 212 simply updates the relevant data structures.

DLCSMT provides a well-defined abstraction that allows users to write their custom logic to update "runtime_metrics" in the JobInfo data structure 1 described above. This abstraction allows users to select different mechanisms for updating metrics during simulation. DLCSMT concepts keep job information in the flexible JobInfo data structure that allows users to use additional information like preemption overhead, startup overhead, etc., during simulation. Overall, this design ensures that the difference in the code path between simulation and cluster runs are minimal, limited to two modules, thus improving the fidelity of the simulator.

Figure 4:
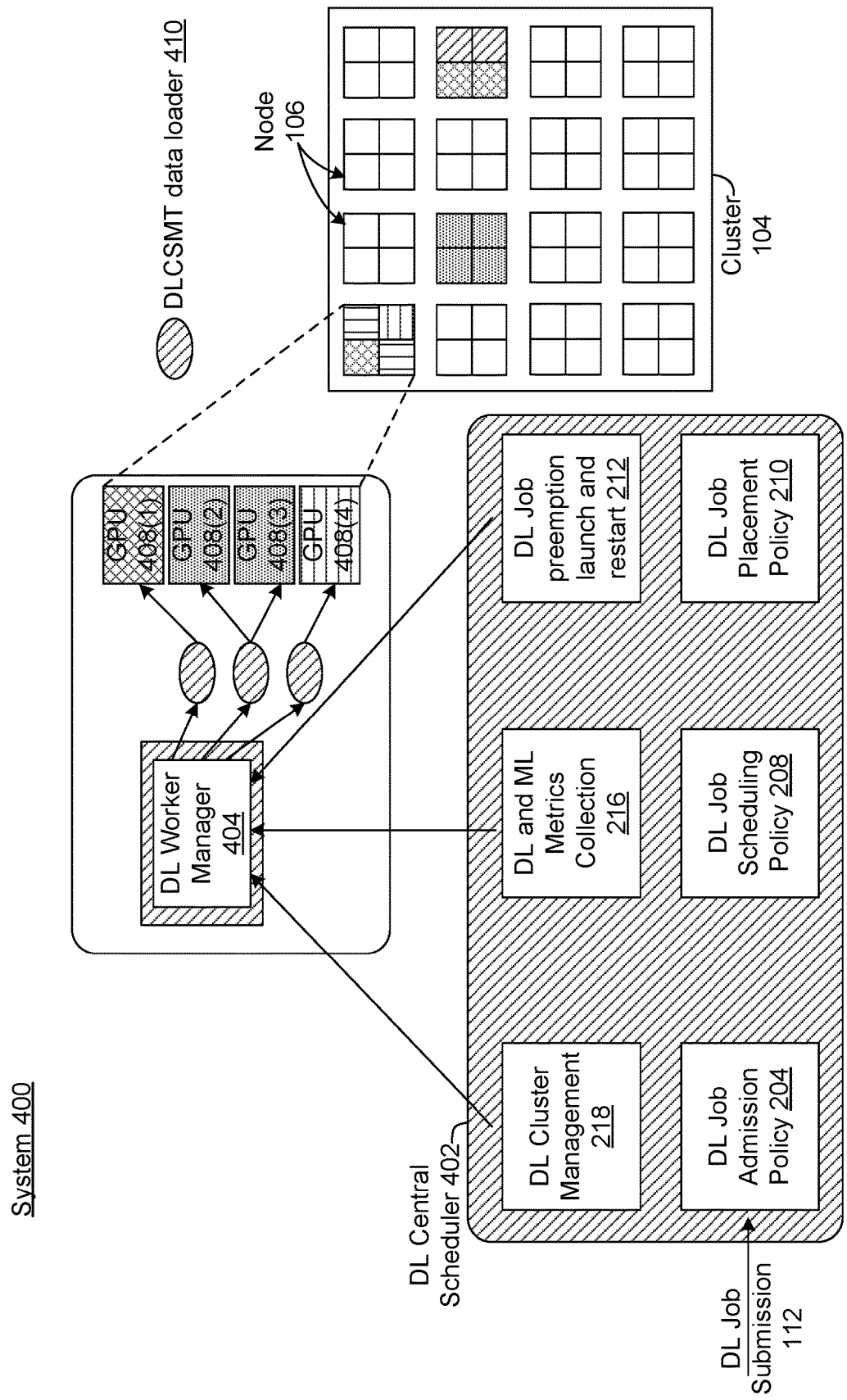
FIGS. 4 and 6 show example systems that are consistent with some implementations of the present deep learning cluster scheduler modular toolkit concepts.

FIG. 4 shows an example system 400 that can support DLCSMT. System 400 includes three high level components including a DL central scheduler 402, DL worker manager 404, and DLCSMT client library 406. The central scheduler 402 receives the DL job submissions 112. The DL central scheduler 402 runs a majority of the scheduling logic. DL worker manager 404 runs on each node 106 and manages the node. For instance, the DL worker manager 404 can manage the processors (108, FIG. 2), which in this case are GPUs 408. DLCSMT client library 406 allows DL training jobs to interact with DLCSMT.

DL central scheduler 402 includes job admission policy module 204, job scheduling policy module 208, job placement policy module 210, job preemption, launch, and restart module 212, DL and ML metrics collection module 216, and cluster management module 218. The DL central scheduler 402 provides centralized processes to perform scheduling and resource management decisions. DL central scheduler 402 encapsulates all the functionalities needed for centralized decision making and instantiates the modules related to job scheduling, placement decisions and cluster management.

DL worker manager 404 runs on every node 106 in the cluster 104 to manage operations on the node and execute the decisions made by the DL central scheduler 402 (e.g., job launch, preemption, etc.). DL worker manager 404 also acts as local state store for applications to push metrics which will be used by DL worker manager 404 in future decision making. Finally, the DL worker manager 404 also plays a vital role in enabling job preemption as will be described below.

DLCSMT client library 406 provides a client library that applications can use to collect application related metrics that are used by DL schedulers. Furthermore, supporting iteration-level preemption of DL training also can require integration between the applications and DLCSMT. The DLCSMT client library 406 addresses these two collection and integration requirements. DLCSMT client library 406 is composed of a DLCSMT data loader sub-component 410 and a push metrics sub-component 412.

DLCSMT data loader sub-component 410 acts as a wrapper over the native (e.g., PyTorch or Tensorflow) data loader and provides a few other additional functionalities in addition to providing the data for next iteration. Similar to existing data iterators, DLCSMT data loader sub-component 410 enables a lease-based preemption mechanism, which will be described in more detail below. DLCSMT data loader sub-component 410 checks the lease status with the DL worker manager 404 at each iteration and if the lease is not available the application is preempted by taking a consistent checkpoint. DLCSMT data loader sub-component 410 can be used by adding a few lines in the application code, one line of importing DLCSMT client library 406 and the second line to wrap PyTorch or Tensorflow data loader into DLCSMT data loader sub-component 410. Once the DLCSMT data loader sub-component 410 is wrapped it can be used as a drop-in replacement.

Push metrics sub-component 412 allows an application to provide the DL central scheduler 402 with the metrics at runtime using a well-defined interface. The push metrics sub-component 412 can include an interface that accepts a generic key-value pair from applications and thus allows them to send any arbitrary application metric like loss, norm of gradients, validation accuracy, etc., to the push metrics sub-component 412.

DL central scheduler 402 includes DL job admission policy module 204 that implements the DL job admission DL scheduler abstraction. DL job admission policy module 204 receives the DL job submission 112, which can be submitted to it using an RPC call. If the DL job admission DL scheduler abstraction permits accepting the job, the DL job admission policy module 204 assigns the job an ID and records an additional received timestamp. The DL job admission policy module 204 holds these jobs in a buffer (e.g., DL job wait queue 206 of FIG. 2) and in the next round updates the job info data structure 1 with the newly received job.

DL cluster management module 218 tracks cluster resources. DL worker manager 404 launches when a new node 106 (e.g., machine) is added to the cluster 104. The DL worker manager 404 makes an RPC call to the DL cluster management module 218 with information about the new machine including the number of GPUs, IP addresses, RAM, CPU, etc. The DL cluster management module 218 holds this information in the buffer. In the next round, when the DL central scheduler 402 calls the DL cluster management module 218, the DL cluster management module updates the cluster info data structure (e.g., DLCSMT cluster info schema 300 of FIG. 3) with all the information.

The DL and ML metrics collection module 216 makes RPC calls to each instance of DL worker manager 404 to collect the application as well as system level metrics. Upon receiving these metrics, DL and ML metrics collection module 216 updates job info into the job info data structure with the corresponding application metrics and DLCSMT cluster info schema 300 of FIG. 3 with cluster info and system level metrics.

In each round, the DL central scheduler 402 calls the DL job scheduling policy module 208 to get the DL job scheduling policy. The DL job scheduling policy module 208 takes the job info and cluster info and, based on the DL job scheduling policy implementation, outputs a priority list of Job ID's to schedule sorted by their priorities. If the DL job scheduling policy module 208 wants to add any extra information like placement preference, locality preference, and/or node preference to use for making subsequent decisions, the DL job scheduling policy module 208 can add the additional fields in job info, which can be used by downstream modules.

The DL job placement policy module 210 takes the job ID priority list and job info generated by DL job scheduling policy module 208 and cluster info (e.g., DLCSMT cluster info schema 300) as input. The DL job placement policy module 210 outputs the job IDs to preempt and map job IDs to launch and the corresponding GPU to launch on.

DL central scheduler 402 can track cluster utilization by accessing the state maintained in DLCSMT cluster info schema 300, after updates by the DL and ML metrics collection module 216 and DL job preemption, launch, and restart module 212. This tracking can entail used and free GPU's but also resource utilization across fleet) over time (e.g., every round duration).

The DL job preemption, launch, and restart module 212 takes in the job IDs to preempt and job IDs to launch as input. For launching a job, the DL job preemption, launch, and restart module 212 instructs the correct DL worker manager 404 to launch the associated "launch_command" for the job ID. In some implementations the DL worker manager 404 is responsible for making sure that prior jobs have safely exited before launching the new jobs on the cluster 104. For preemption, DL job preemption, launch, and restart module 212 can use the lease renewal mechanism discussed in subsequent paragraphs to safely preempt jobs.

DL central scheduler 402 can perform centralized lease checks. In previous solutions, attempts at centralized lease checks have resulted in high overhead and can affect training efficiency. There are two issues with this design. First, applications need to be aware of round duration which puts undue burden on the application developer. Second, if the central scheduler is not available the jobs will be blocked and cannot proceed.

DL central scheduler 402 can overcome the challenges with centralized lease checks with a novel technical solution that involves optimistic lease renewals. In optimistic lease renewals, the DL central scheduler 402 sets the lease status to terminate with the worker manager 404 when the DL central scheduler wants to preempt a job. DLCSMT data loader 410 can be configured to locally check with the worker manager 404 if it can proceed with the iteration. In case the lease status has not been changed, the system can operate on the assumption that the application can proceed to the next training iteration.

When preempting distributed jobs, there can be a deadlock due to the termination signal reaching different nodes at different times. Due to the termination signal reaching at different times, instances of DL worker manager 404 might see different states of the lease. This can lead to some DL worker managers 404 proceeding while some DL worker managers deciding to terminate, causing deadlocks and inconsistent checkpoints. To solve this technical problem, the present concepts offer a technical solution that entails a two phase optimistic lease renewal mechanism.

Two phase optimistic lease renewal is built on the idea of allowing the distributed worker managers to coordinate among themselves and reach a consensus when to safely terminate. In two phase optimistic lease renewal, the DL central scheduler 402 sends the lease termination signal to only one instance of the training DL worker manager 404. This one DL worker manager 404 then looks at the current iteration number and decides to terminate after the next iteration, i.e., if the current iteration at the time of receiving is Iteri then the process will terminate at Iteri+1. Next this DL worker manager synchronously propagates the iteration number to all other DL worker managers. Following this, all the DL worker managers exit in tandem at Iteri+1. This leads to consistent checkpoints and no deadlock. A potential drawback of this approach is that the job exit is delayed by one iteration. However, since the iteration time is significantly smaller than the round duration, this delay is inconsequential.

The description above emphasizes the DL scheduler abstraction provided by DLCSMT. The description below explains how the DLCSMT DL scheduler abstractions can be chained together to build a DL scheduler. Code snippet 1 shows how to run Pollux's scheduling policy with minimum network interference placement policy. First, the process initializes the DLCSMT with scheduling policy of Pollux and uses the placement policy which minimizes the network interference. Next, the process waits for the round duration amount of time. Then the process fetches all the new jobs which have arrived in this round duration. After fetching the jobs and updating job info, the process updates cluster info with any new updates to the cluster. Next, the process fetches metrics and updates the metrics associated with each job. Once all the metrics are obtained, the process calls the DL job scheduling policy module 208 to get the list of job ID's to schedule sorted by their priority. After that the process calls the DL job placement policy module 210 which determines which job ID's to preempt and which job ID's to launch and on what GPU. The process sends this information to the DL job preemption launch and restart policy module 212 which revokes the lease of the job ID's to preempt and launches the job ID's which need to be terminated.

Code snippet 1. (In the code DLCSMT is referred to as 'Blox.')

```
blox = Blox.init(
        scheduling_policy=Pollux
        placement_policy=min_network_interference
)
# changing placement policy to first_free_gpu
# blox = Blox.init(
#       scheduling_policy=Pollux,
#       placement_policy=first_free_gpu
# )
while True:
        # wait for round duration
        Time.sleep(round_duration
        # update job_info with new jobs
        blox.get_new_jobs(job_info)
        # update cluster_info
        blox.updated_cluster_stats(cluster_info)
        # fetch application metrics for each job
        blox.get_metrics(job_info, cluster_info)
        # return job id's to schedule sorted by priority
        job_ids_to_schedule = blox.schedule_jobs(
            job_info, cluster_info
        )
        # find placements - return which jobs to preempt
        # and return jobs to launch and GPU ID
            job_ids_to_preempt,job_ids_to_launch       =
            blox.place_jobs(jobs_ids_to_schedule,job_info,cluster_info
        )
        # preempt and launch jobs
        blox.preempt_and_launch(job_ids_to_preempt,
        job_ids_to_launch, cluster_info
        )
```

The description now provides an example of how a new DL scheduling policy can be implemented in DLCSMT. To highlight flexibility a hypothetical policy called Least Loss Policy can be used. This hypothetical policy gives higher priority to jobs which have smaller training loss value. To build such a policy in DLCSMT, the process can entail modifying two abstractions in DLCSMT—(i) DL job scheduling policy and (ii) Applications to push the latest training loss from the applications.

The DL job scheduling policy module 208 can read the "training_loss" in the job info data structure for all the jobs and return them sorted by their "training_loss". Code snippet 2 shows example code for performing this. Next in the applications the process can add a push_metric call which pushes the key-value pair of "training_loss" and the current loss value. This demonstrates how with just two lines of code the process is able to implement a completely new DL scheduling policy and will easily be able to run it without writing code for cluster management or metric collection or launching jobs.

Code snippet 2.

```
jobs_sorted_by_loss = sorted(
    job_info.items( ),
    key=lambda x: (x[1]["tracked_metrics"]["training_loss"])
)
```

Modularity is one of the core design goals of DLCSMT. One aspect of modularity is that DLCSMT allows users to easily mix and match different instances of these abstractions.

Example: Suppose the user wants to delineate a contribution of an existing scheduler's placement policy from the scheduler's scheduling policy. When using DLCSMT, the user can use the existing scheduling policy with another policy like first free GPU which places the job on the first free available GPU on the cluster. Line 2 in code snippet 1 (commented init) depicts how easy it is to switch those policies. This shows that DLCSMT can easily allow users to isolate the contribution of one aspect of the DL scheduler from another.

Prior work has observed that "around 75% of jobs reach within 0.1% of lowest loss using only 40% of the epochs." This indicates that ML engineers typically overestimate the number of epochs needed to reach the desired loss value. To study the benefits of this observation, in DLCSMT with just 4 additional lines of code, the process adds a new loss based job termination policy. The policy implemented is the following: for each job received as input an additional parameter can determine the relative loss threshold for termination. Next, in the DL scheduling policy, the process adds code to check if the current loss is below the threshold and terminates if it is. To perform metric collection, the process augments the application to push the loss metric using the DL client library which entails another two lines of code.

DL jobs are known to be very placement sensitive, therefore placement policies play a very important role in DL job scheduling. This section shows how users can easily add new placement policies in DLCSMT. Prior work in scheduling only tries to consider the case of packing distributed DL training jobs together on the same node. However, they do not consider the interference on the throughput of a job due to other jobs running on the same node. This scenario arises frequently in a cluster where nodes have more than one GPU (e.g., four V100 GPUs), but the scheduler allocates each GPU to a different job.

Studying this interference, involved choosing common neural networks and running all possible combinations for each of them on a 4-GPU p3.8xlarge machine. Certain combinations of DL jobs can create interference leading to slowdowns when compared to running exclusively on the node.

Slowdown can be computed with respect to the observed per iteration time when the DL job has exclusive access to the node, i.e., the DL job was using a single V100 on p3.8xlarge but no other job was running on the node. Under certain configurations (e.g., for the Recoder model running alongside two Resnet-50 and one A3c), slowdown can be observed by as much as 1.4×, compared to when the DL job is running exclusively on the whole node with a single GPU. This indicates that placement is an important concern even for single node DL jobs and motivates the need for a DL placement policy that can minimize the throughput loss that arises from job co-location. The discussion next considers two different placement policies and discusses how DLCSMT allows easy exploration of various placement policies.

Profile guided placement policy can profile the expected throughput of all possible DL job combinations on a target machine. At the time of placement, the process can choose to place the DL job at a location in the cluster such that it leads to minimum cumulative loss in throughput for the DL jobs running on that node. For example, consider a scenario that places a new DL job J, which can be placed at two different nodes A and B. Using the profiled data, the process can calculate the change in throughput of the jobs running on nodes A and B if DL job J will be placed on the respective node. If say placing DL job J on node A will lead to a total slowdown of 10% for all the DL jobs on node A, while placing J on node B will lead to a slowdown of 5%, the process will choose node B to place the DL job. To reduce the overheads in migrating DL jobs, the placement policy may only consider GPUs currently available and does not suspend any other job in order to find a better placement. However, the downside of this policy is the need to pre-profile all possible combinations of DL jobs which can be very expensive and time consuming.

The description now turns to learned placement policy. One of the main drawbacks of the profile guided placement policy is the overhead of generating the necessary profiles. Even with just seven configurations and a homogeneous cluster, the process may need to perform profiling of 752 unique configurations. Profiling all these configurations takes upwards of 5 hours on p3.8xlarge.

Figure 5:
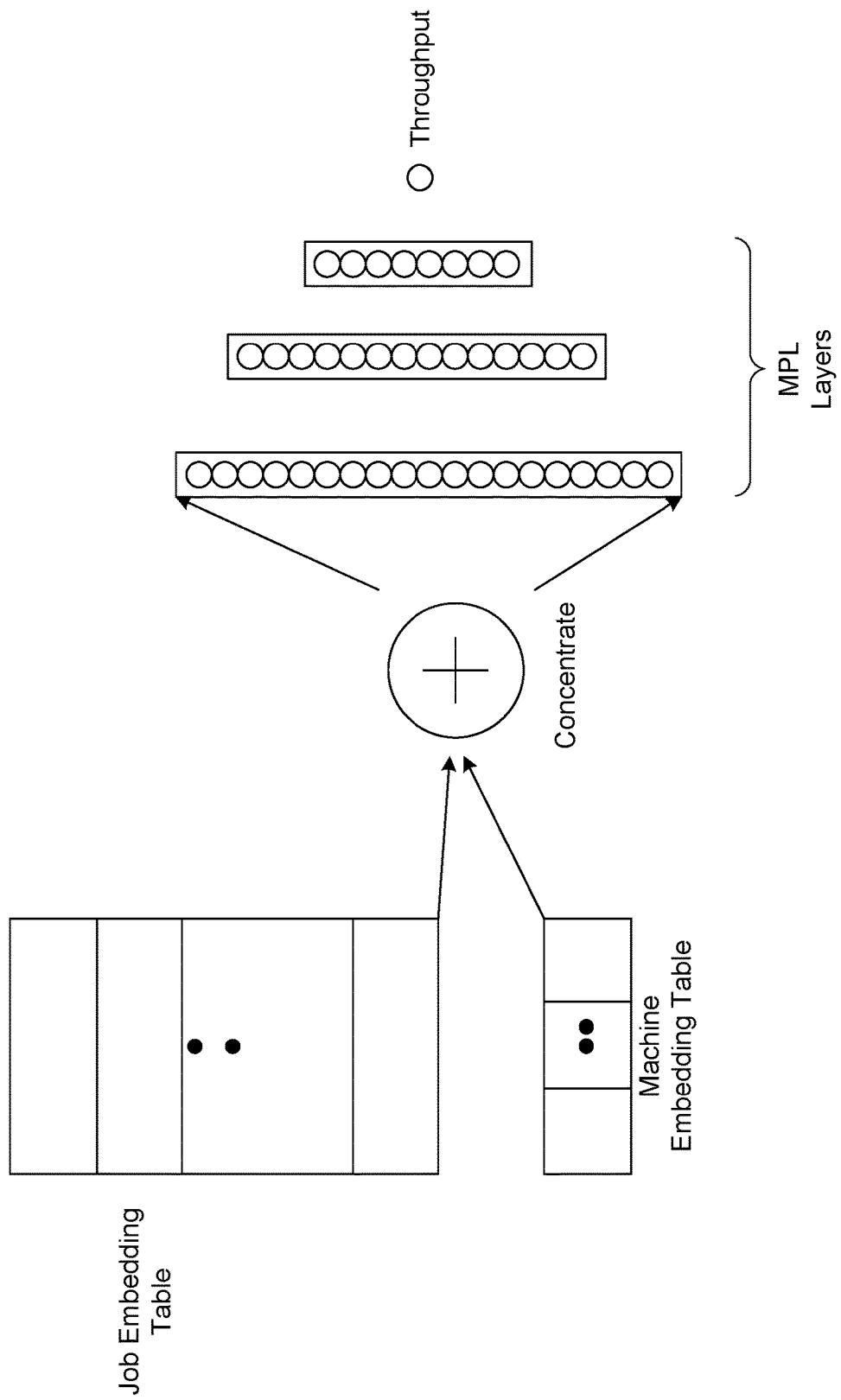
FIG. 5 shows an example deep learning cluster scheduler modular toolkit throughput predictor model that is consistent with some implementations of the present concepts.

To reduce the profiling overhead, the present DLCSMT concepts can involve a new learned placement policy. The main component of this learned placement policy is the DLCSMT throughput predictor model 500 illustrated in FIG. 5. This DLCSMT throughput predictor model 500 is inspired from recommendation models which are typically used for click through rate prediction. Similar to a recommendation model, each job type is represented by an embedding vector and also includes a null job which represents absence of a DL job. Furthermore, another embedding table represents the hardware of the training node. This example DLCSMT throughput predictor model 500 uses different features of the hardware to represent a machine: namely CPU, GPU type, RAM, and/or disk bandwidth, among others. Next the process adds fully connected (FC) layers which take these embeddings as input and predict the total throughput of all the co-located DL jobs. This example DLCSMT throughput predictor model 500 uses the embedding size of 16, which means that all the features like job type, CPU type, GPU type, etc. in the embedding table are represented by a vector of size 16.

The process creates four FC layers that transform the 128 dimensional input (four jobs and four resource types each having 16 features) to the throughput (single number) value. To perform a forward pass for predicting the throughput of a DL job J, the process fetches the embeddings for the job type of J and the jobs which are already being trained on the respective GPU slot on the node. In case a GPU is not running any job, the process uses the null job embedding. The process also fetches the embeddings, like CPU type, GPU type, RAM, disk bandwidth that represent the training node. Next, the process concatenates all the features and feeds it into the FC layers to predict the throughput. Training can be performed using Adam optimizer with batch size of 64 and mean square error loss.

To integrate the DL learned placement policy in DLCSMT, the process can use the pre-trained throughput predictor and run a forward pass for every available machine as described above. Similar to the profile guided placement policy, the process can choose the location which leads to least expected slowdown.

Adding these placement policies in DLCSMT can be accomplished with minor changes to the DL job placement module. This modeling is generic enough to be used in other settings like a heterogeneous cluster and/or with distributed jobs, etc. An evaluation of the newly proposed placement policies is described below.

The discussion above has been focused on DL cluster schedulers for DL training jobs. However, the DLCSMT design is flexible enough to support implementations of inference schedulers as well. This is shown by implementing a scheduler for serving DNN models and is composed of three components—(i) Job Frontend, (ii) Job Backend, and (iii) Global Scheduler. In this case, the Job Frontends are responsible for receiving the data for an inference request and routing it to the appropriate Backend for the inference request. Job Backends are GPU servers which host the model for inference and upon receiving the inference request they process the inference request based on a predefined schedule. In some of these previous inference schedulers, the global scheduler acts as the control pane and provides the Job Frontend with routing tables, indicating which Job Backend to send the request to. Similarly, the global scheduler provides the execution logic for requests.

This global scheduler can be implemented in the DLCSMT DL scheduling abstraction where, based on the number of requests received at the job frontend, the global scheduler autoscales the number of frontends. Next, the ScheduleSaturate policy can be implemented. In this case the Job Scheduling Policy decides the batch size for the workload that is large enough for saturating the GPU while meeting the SLOs. After this, using the same mechanism by which lease for training schedulers for training jobs are updated, the process sends the new routing table to the frontend jobs. The frontends send the requests received per unit time using DLCSMT client library to enable the DL cluster scheduler to make future routing and execution decisions.

To show the flexibility of abstractions provided in DLCSMT, the process can implement a popular hyperparameter tuning algorithm which performs efficient random search. At a high level, the algorithm can also be thought of as a scheduling algorithm, where the algorithm based on training progress chooses which configuration to continue running and which configurations to discard. The process can implement a hyperparameters candidate generating module in the workload generator while implementing job pruning logic as a scheduling policy. Further, the process can modify the DLCSMT client library to collect and propagate the loss to the central resource scheduler.

DLCSMT implementations were evaluated along three main axes: the ability to implement existing DL schedulers, the potential for implementing new DL schedulers, and the fidelity of the simulation. First, the flexibility of using DLCSMT to implement DL scheduling policies proposed by recent scheduling frameworks is evaluated. Next, DLCSMT's ability to help researchers develop new DL schedulers by studying new placement policies is evaluated. Finally, the fidelity of DLCSMT's simulations to physical cluster runs and DLCSMT's ability to reproduce results published by authors of prior schedulers is evaluated.

DLCSMT was evaluated in two modes, cluster mode (running jobs on actual cloud servers) and simulator mode. Unless otherwise stated, the experiments on cluster mode used 8× p3.8xlarge as training machines and 1× c5.4xlarge for the central resource manager.

The experiments used the production traces derived from Microsoft's Philly Cluster. Each job in the Philly trace uses the provided Job GPU Demand and Job Duration. The process involved randomly assigning one of the DL models to each DL job. The job arrival time for training was assigned using the Poisson arrival process with an inter arrival rate of λ. Varying λ modifies the job arrival rate, allowing the process to generate different variations in load. This is similar to the procedure used to evaluate prior DL schedulers.

The process compared DLCSMT with Pollux by using the workload trace provided by the authors of Pollux. For experiments on the physical cluster, the process extracts a subset of 100 DL jobs that have resource demands that are proportional to cluster size so as to keep the cluster fully occupied over a sizable interval of time (GPU demand>Number of GPUs available).

The process demonstrates the flexibility of DLCSMT by implementing a number of existing scheduling and placement policies that have been proposed in prior work. The process implemented the following scheduling policies: First in First Out (FIFO), single queue Least Attained Service (LAS) and discreet-LAS, heterogeneity-aware LAS, and Finish Time Fairness (FTF) from Themis in DLCSMT. In order to estimate the implementation overhead for each of these prior frameworks, the process started with a FIFO scheduler as the baseline and then counts the number of modules that need to be updated or added in order to realize a particular system. Most schedulers only require changing two or three modules and involve 100s of lines of code changes. The exception here is Pollux, which includes code to evaluate training efficiency based on convergence and optimize for goodput. Further, Pollux uses a workload trace with a different schema with a few additional fields. Due to the use of a different schema, a new workload parser was added that resulted in around 350 extra lines of code. Overall, the results demonstrate that with very minimal changes a user can implement a wide variety of DL schedulers in DLCSMT, thus enabling users to quickly prototype existing DL schedulers on new workloads.

The discussion now turns to the evaluation of new placement and termination policies described above. The loss-based job termination policy was evaluated, using the derived Philly trace. The process randomly assigned 75% of the jobs to converge in 40% of their iteration time. Compared to using the number of epochs as the termination criteria, using loss-based termination leads to reduction in average JCT by around 44%.

The interference-aware placement policies were compared with LAS as the scheduling policy. For baseline, the process used the First-Free GPU placement policy, which chose the first available GPU to place the DL job. Using profiled data, 86% of the DL jobs which observed slowdown using First-Free GPU are no longer slow. Next, when using the learned placement policy, the model trained with just 40% of the profiled configurations can speed up 80% of the DL jobs which were originally facing slowdown of more than 10%. This in turn will mean that the present concepts can reduce the time spent in profiling by 60%. Note that this modeling is generic enough to be used in other settings like a heterogeneous cluster, and with distributed DL jobs, etc.

DLCSMT was evaluated for the fidelity and usability of DLCSMT's simulator. To perform a comprehensive comparison, DLCSMT was evaluated with two setups. First, DLCSMT's simulation was compared with DLCSMT running on an actual cluster. Next, Pollux simulated in DLCSMT was compared to the simulator provided by authors of Pollux.

DLCSMT's simulator was compared to actual cluster runs by plotting the cumulative distribution function (CDF) of job completion times on a trace of 100 DL jobs arriving at the load average of 4 jobs per hour. The comparison was also done using FIFO scheduling policy and First-Free GPU placement policy. For 72% of DL jobs the deviation in job completion time between simulation and cluster run was less than 10%. While some of the DL jobs had larger deviation, the deviation can be attributed to EBS warmup time on AWS, which results in a slow down when a particular job is run for the first time on a machine. This can be addressed in DLCSMT simulator by including additional profiling information that includes a startup cost for each job on a new machine.

Compared to existing simulators showed that DLCSMT can faithfully reproduce existing scheduling algorithms. Simulation of Pollux implemented in DLCSMT was compared with the simulator provided by authors of Pollux. The process uses the same workload from the Pollux repository. The simulations performed using DLCSMT very closely tracks those performed using the standalone Pollux simulator. The maximum deviation observed between DLCSMT's simulation and Pollux's simulation was 9%. This can be attributed to non-determinism in the scheduling policy used in Pollux.

The description now turns to overheads introduced by the implementation of DLCSMT. DLCSMT performs some periodic maintenance operations like metric collection, new job acceptance, add/remove machines from the cluster, etc. These operations update DLCSMT's internal state and provide updated information for scheduling and placement. The overhead was studied using the same experimental setups as discussed above using FIFO as the scheduling algorithm and FirstFree GPU placement. As a proportion of round duration, the overhead introduced by DLCSMT is around 0.6% for a round duration of 60 seconds. This shows that despite its generality, DLCSMT introduces very little overhead.

For lease renewals as discussed above, an optimistic lease renewal mechanism is employed which avoids frequent round trips over the network to the DL central scheduler. To compare existing centralized lease renewal mechanisms with the proposed optimistic lease renewal, the process used the same experimental setup of 32 GPUs as described above. The time spent by optimistic lease renewal in a round duration of 60 seconds is 32× less than time spent by centralized lease checking. This observed speedup is because the DLCSMT process checks the lease locally in the case of optimistic lease renewal, while centralized checking applications make a round trip over the network to check the lease status.

DLCSMT is a modular toolkit to allow entities, such as researchers and practitioners, to build new DL scheduling algorithms. DLCSMT provides a set of extensible building blocks which a user can easily modify to implement new and existing scheduling algorithms. The ease of use of DLCSMT is described by implementing five different DL training schedulers and one inference scheduler, and validating them by reproducing results from existing schedulers. Furthermore, the description highlights DLCSMT's extensibility by building two novel scheduling policies and shows how DLCSMT is amenable to be used for scheduling hyperparameter tuning jobs. DLCSMT will be a resource that the systems research community can use, and refine, to quickly prototype new DL scheduler ideas and compare them with existing methods on evolving workloads.

Figure 6:
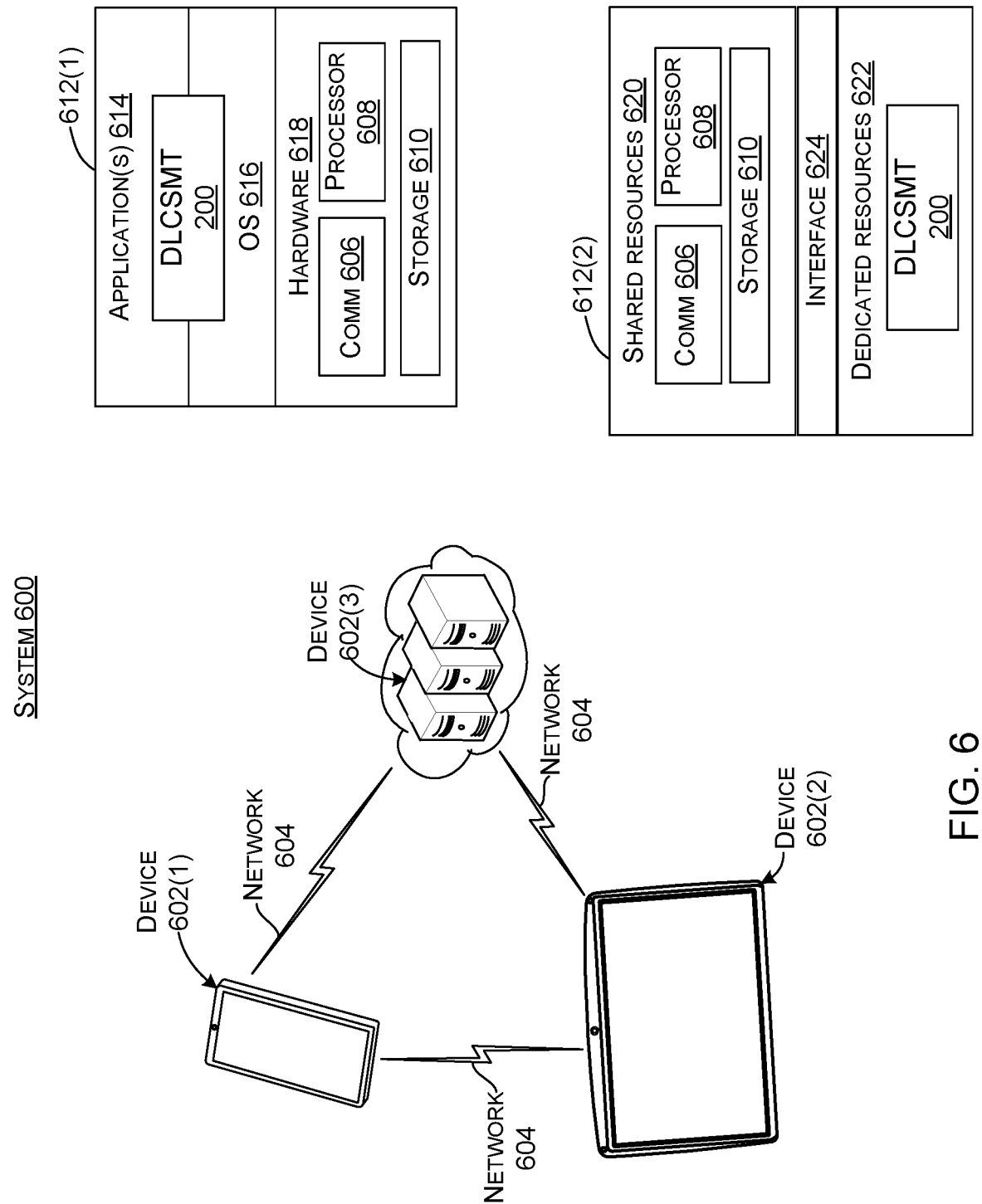

FIG. 6 shows an example system 600. System 600 can include computing devices 602. In the illustrated configuration, computing device 602(1) is manifest as a smartphone, computing device 602(2) is manifest as a tablet type device, and computing device 602(3) is manifest as a server type computing device, such as may be found in a datacenter. Computing devices 602 can be coupled via one or more networks 604 that are represented by lightning bolts.

Computing devices 602 can include a communication component 606, a processor 608, storage 610, and/or DLCSMT 200.

FIG. 6 shows two device configurations 612 that can be employed by computing devices 602. Individual devices 602 can employ either of configurations 612(1) or 612(2), or an alternate configuration. (Due to space constraints on the drawing page, one instance of each configuration is illustrated). Briefly, device configuration 612(1) represents an operating system (OS) centric configuration. Device configuration 612(2) represents a system on a chip (SOC) configuration. Device configuration 612(1) is organized into one or more applications 614, operating system 616, and hardware 618. Device configuration 612(2) is organized into shared resources 620, dedicated resources 622, and an interface 624 therebetween.

In configuration 612(1), the DLCSMT 200 can be manifest as part of the processor 608. Alternatively, the DLCSMT 200 can be manifest as applications 614 that operate in conjunction with the processor 608. In configuration 612(2), the DLCSMT 200 can be manifest as part of the processor 608 or a dedicated resource 622 that operates cooperatively with the processor 608.

In some configurations, each of computing devices 602 can have an instance of the DLCSMT 200. However, the functionalities that can be performed by the DLCSMT 200 may be the same or they may be different from one another when comparing computing devices. For instance, in some cases, each DLCSMT 200 can be robust and provide all of the functionality described above and below (e.g., a device-centric implementation).

In other cases, some devices can employ a less robust instance of the DLCSMT 200 that relies on some functionality to be performed by another device.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 612(2) can be thought of as a system on a chip (SOC) type design. In such a case, functionality provided by the device can be integrated on a single SOC or multiple coupled SOCs. One or more processors 608 can be configured to coordinate with shared resources 620, such as storage 610, etc., and/or one or more dedicated resources 622, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 7:
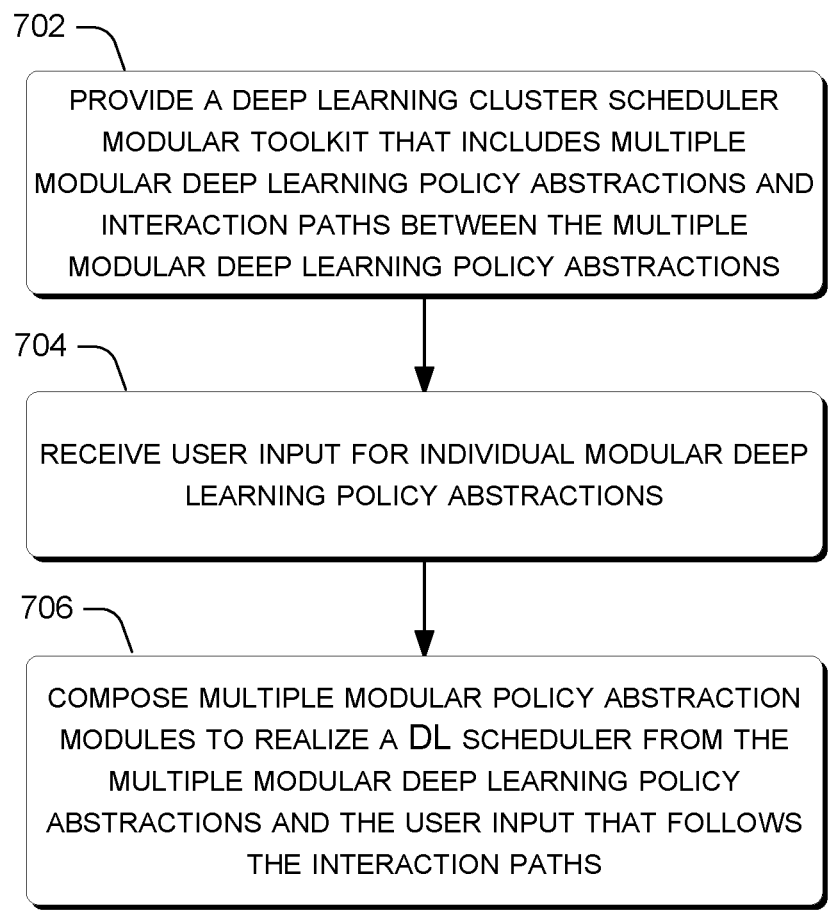
FIG. 7 shows an example flowchart for accomplishing deep learning cluster scheduler modular toolkit concepts in accordance with some implementations.

Several implementations are described in detail above. FIG. 7 shows another example deep learning cluster scheduler modular toolkit method or technique 700.

Block 702 can provide a deep learning cluster scheduler modular toolkit that includes multiple modular deep learning scheduler abstractions and interaction paths between the multiple modular deep learning scheduler abstractions.

Block 704 can receive user input for individual modular deep learning scheduler abstractions.

Block 706 can compose multiple modular deep learning scheduler abstraction modules to realize a DL scheduler from the multiple modular deep learning scheduler abstractions and the user input that follows the interaction paths The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Various examples are described above. Additional examples are described below. One example includes a system comprising storage configured to store computer-readable instructions and a processor configured to execute the computer-readable instructions to generate a deep learning cluster scheduler modular toolkit that includes multiple DL scheduler abstraction modules and interactions between the multiple DL scheduler abstraction modules and allows user composition of the multiple DL scheduler abstraction modules to realize a DL scheduler.

Another example can include any of the above and/or below examples where the deep learning cluster scheduler modular toolkit further includes interaction pathways between pairs of the multiple DL scheduler abstraction modules upon which the interactions occur.

Another example can include any of the above and/or below examples where the deep learning cluster scheduler modular toolkit further allows the user to change composition of an individual DL scheduler abstraction module to change the DL scheduler without having to change other DL scheduler abstraction modules.

Another example can include any of the above and/or below examples where the deep learning cluster scheduler modular toolkit comprises a deep learning admission policy module.

Another example can include any of the above and/or below examples where the deep learning cluster scheduler modular toolkit comprises a deep learning job weight queue that is configured to receive DL jobs from the deep learning admission policy module.

Another example can include any of the above and/or below examples where the deep learning cluster scheduler modular toolkit comprises a deep learning scheduling policy module configured to receive DL jobs from the deep learning job weight queue.

Another example can include any of the above and/or below examples where the deep learning cluster scheduler modular toolkit comprises a deep learning job placement policy module configured to receive DL job scheduling instructions from the deep learning scheduling policy module.

Another example can include any of the above and/or below examples where the deep learning cluster scheduler modular toolkit comprises a deep learning job preemption launch and restart policy module configured to receive DL job placement instructions from the deep learning job placement policy module.

Another example can include any of the above and/or below examples where the deep learning cluster scheduler modular toolkit comprises a deep learning and machine learning metrics collection module configured to track application and system level metrics information relating to a cluster that is training the DL jobs.

Another example can include any of the above and/or below examples where the deep learning cluster scheduler modular toolkit comprises a deep learning cluster management module configured to track resources of the cluster.

Another example includes a device-implemented method, comprising providing a deep learning cluster scheduler modular toolkit that includes multiple modular deep learning scheduler abstractions and interaction paths between the multiple modular deep learning scheduler abstractions, receiving user input for individual modular deep learning scheduler abstractions, and composing multiple modular scheduler abstraction modules to realize a DL scheduler from the multiple modular deep learning scheduler abstractions and the user input that follows the interaction paths.

Another example can include any of the above and/or below examples where the receiving comprises receiving through an application program interface provided by the deep learning cluster scheduler modular toolkit.

Another example can include any of the above and/or below examples where the receiving comprises receiving user input that defines values for an individual modular deep learning scheduler abstraction.

Another example can include any of the above and/or below examples where the composing is configured to allow the user to make adjustments to the individual modular deep learning policy abstraction without adjusting other individual modular deep learning policy abstractions.

Another example includes a system comprising a deep learning central scheduler configured to utilize DL scheduler abstractions to make scheduling decisions for deep learning (DL) job submissions, a deep learning worker manager configured to manage cluster resources for the DL job scheduling decisions based upon the DL scheduler abstractions, and a deep learning cluster scheduler modular toolkit client library configured to collect application related metrics and provide integration between applications and the deep learning central scheduler.

Another example can include any of the above and/or below examples where the DL scheduler abstractions of the deep learning central scheduler include a deep learning job admission policy abstraction, a deep learning cluster management policy abstraction, a deep learning and machine learning metrics collection policy abstraction, a deep learning job scheduling policy abstraction, a deep learning job preemption launch and restart policy abstraction, and a deep learning job placement policy abstraction.

Another example can include any of the above and/or below examples where an instance of the deep learning worker manager launches for each DL job running on a cluster.

Another example can include any of the above and/or below examples where the deep learning cluster scheduler modular toolkit client library comprises a DLCSMT data loader sub-component.

Another example can include any of the above and/or below examples where the deep learning cluster scheduler modular toolkit client library comprises a push metrics sub-component.

Another example can include any of the above and/or below examples where the system further comprises a DLCSMT throughput predictor model that is configured to utilize hardware features of the cluster to predict total throughput of submitted jobs that are co-located on the cluster.

CONCLUSION

Although techniques, methods, devices, systems, etc., pertaining to DLCSMT concepts are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A system, comprising:
storage configured to store computer-readable instructions; and
a processor configured to execute the computer-readable instructions to generate a deep learning cluster scheduler modular toolkit that includes multiple deep learning (DL) scheduler abstraction modules and interactions between the multiple DL scheduler abstraction modules and allows user composition of the multiple DL scheduler abstraction modules to realize a DL scheduler and is further configured to allow the user to change composition of an individual DL scheduler abstraction module to change the DL scheduler without having to change other DL scheduler abstraction modules.

2. The system of claim 1, wherein the deep learning cluster scheduler modular toolkit further includes interaction pathways between pairs of the multiple DL scheduler abstraction modules upon which the interactions occur.

3. The system of claim 1, wherein the deep learning cluster scheduler modular toolkit comprises a deep learning admission policy module.

4. The system of claim 3, wherein the deep learning cluster scheduler modular toolkit comprises a deep learning job wait queue that is configured to receive DL jobs from the deep learning admission policy module.

5. The system of claim 4, wherein the deep learning cluster scheduler modular toolkit comprises a deep learning scheduling policy module configured to receive DL jobs from the deep learning job wait queue.

6. The system of claim 5, wherein the deep learning cluster scheduler modular toolkit comprises a deep learning job placement policy module configured to receive DL job scheduling instructions from the deep learning scheduling policy module.

7. The system of claim 6, wherein the deep learning cluster scheduler modular toolkit comprises a deep learning job preemption launch and restart policy module configured to receive DL job placement instructions from the deep learning job placement policy module.

8. The system of claim 7, wherein the deep learning cluster scheduler modular toolkit comprises a deep learning and machine learning metrics collection module configured to track application and system-level metrics information relating to a cluster that is training the DL jobs.

9. The system of claim 8, wherein the deep learning cluster scheduler modular toolkit comprises a deep learning cluster management module configured to track resources of the cluster.

10. A device-implemented method, comprising:
providing a deep learning cluster scheduler modular toolkit that includes multiple modular deep learning scheduler abstractions and interaction paths between the multiple modular deep learning scheduler abstractions;
receiving user input for individual modular deep learning scheduler abstractions; and,
composing multiple modular deep learning scheduler abstraction modules to realize a deep learning scheduler from the multiple modular deep learning scheduler abstractions and the user input that follows the interaction paths and is configured to receive user adjustments to an individual modular deep learning scheduler abstraction module without adjusting other individual modular deep learning scheduler abstraction modules.

11. The method of claim 10, wherein the receiving comprises receiving through an application program interface provided by the deep learning cluster scheduler modular toolkit.

12. The method of claim 11, wherein the receiving comprises receiving user input that defines values for an individual modular deep learning scheduler abstraction.

13. A system, comprising:
a deep learning central scheduler configured to utilize deep learning scheduler abstractions to make deep learning job scheduling decisions for job submissions;
a deep learning worker manager configured to manage cluster resources for the deep learning job scheduling decisions based upon the deep learning scheduler abstractions;
and,
a deep learning cluster scheduler modular toolkit client library configured to collect application related metrics and provide integration between applications and the deep learning central scheduler and further configured to allow changes to a composition of an individual deep learning scheduler abstraction to change the deep learning central scheduler without having to change other deep learning scheduler abstractions.

14. The system of claim 13, wherein the deep learning scheduler abstractions of the deep learning central scheduler include a deep learning job admission deep learning scheduler abstraction, a deep learning cluster management deep learning scheduler abstraction, a deep learning and machine learning metrics collection deep learning scheduler abstraction, a deep learning job scheduling deep learning scheduler abstraction, a deep learning job preemption launch and restart deep learning scheduler abstraction, and a deep learning job placement deep learning scheduler abstraction.

15. The system of claim 14, wherein an instance of the deep learning worker manager launches for each deep learning job running on a cluster.

16. The system of claim 15, wherein the deep learning cluster scheduler modular toolkit client library comprises a deep learning cluster scheduler modular toolkit (DLCSMT) data loader sub-component.

17. The system of claim 16, wherein the deep learning cluster scheduler modular toolkit client library comprises a push metrics sub-component.

18. The system of claim 17, further comprising a DLCSMT throughput predictor model that is configured to utilize hardware features of the cluster to predict total throughput of submitted jobs that are co-located on the cluster.

\* \* \* \* \*